(12) United States Patent
Hofmann et al.

(10) Patent No.: US 7,350,033 B2
(45) Date of Patent: Mar. 25, 2008

(54) METHODS AND SYSTEMS FOR PROVIDING VALIDITY LOGIC

(75) Inventors: Helmut A. Hofmann, Walldorf (DE);
Winfried Schmitt, Walldorf (DE);
Carsten M. Ziegler, Walldorf (DE);
Andreas Balzar, Heidelberg (DE)

(73) Assignee: SAP AG, Walldorf (DE)

( * ) Notice: Subject to any disclaimer, the term of this patent is extended or adjusted under 35 U.S.C. 154(b) by 668 days.

(21) Appl. No.: 10/881,532

(22) Filed: Jun. 30, 2004

(65) Prior Publication Data

US 2006/0004700 A1    Jan. 5, 2006

(51) Int. Cl.
*G06F 12/08* (2006.01)
(52) U.S. Cl. .................................... 711/145; 711/144
(58) Field of Classification Search ............. 707/100; 711/170, 156, 144, 145
See application file for complete search history.

(56) References Cited

U.S. PATENT DOCUMENTS

| | | | |
|---|---|---|---|
| 6,968,498 B1* | 11/2005 | Pal ............................. | 714/807 |
| 6,970,872 B1* | 11/2005 | Chandrasekaran et al. .... | 707/10 |
| 7,076,602 B2* | 7/2006 | Stark et al. ................. | 711/108 |
| 2005/0038799 A1* | 2/2005 | Jordan et al. ............... | 707/100 |

* cited by examiner

*Primary Examiner*—Pierre-Michel Bataille
(74) *Attorney, Agent, or Firm*—Finnegan Henderson Farabow Garrett & Dunner LLP

(57) ABSTRACT

Systems and methods are disclosed for providing validity logic. The disclosed systems and methods may include receiving at least one data value, determining validity data corresponding to the received at least one data value, and providing the validity data corresponding to the received at least one data value. Furthermore, the disclosed systems and methods may include receiving at least one data value, receiving validity data corresponding to the received at least one data value, and determining, based on the received validity data, a validity value, the validity value indicating the validity of the received at least one data value.

30 Claims, 4 Drawing Sheets

METHODS AND SYSTEMS FOR PROVIDING VALIDITY LOGIC

BACKGROUND OF THE INVENTION

I. Field of the Invention

The present invention generally relates to methods and systems for providing validity logic. More particularly, the present invention relates to providing validity logic for data, such as customizing entities.

II. Background Information

In data processing environments, the ability to determine the validity of data is essential. For example, in business software systems and applications, certain data values may become obsolete or need to be retired. This can occur for data representing revised financial statements, discontinued products, sold companies or merged business units, and the like. In such cases, the ability to determine the validity and appropriate processing for these values is necessary to guarantee accurate results.

Validity logic may be provided to allow a user to determine if certain data is valid or not. Such logic may be implemented using various approaches, such as a flag in a database table. The flag can be used to make a corresponding data value "usable" or "not usable." For instance, a field in a database table for a corresponding data value may be flagged as "XDELE". If the "XDELE" flag is set, then the corresponding data value is determined to be invalid.

Conventional approaches to validity logic, such as those noted above, have several drawbacks. For example, the use of a flag does not always provide sufficient information concerning the validity of data. In some cases, it may be necessary to have more information than just whether data the usable, such as when or why the data is valid. For instance, certain may be valid for one time period or interval, while invalid for others. Furthermore, past approaches do not provide sufficient flexibility to the user. For example, with the conventional flag strategy, it is not possible to set conditions to control the validity of data, such as by user interaction, by customizing settings, or by programming logic with default value behavior.

In view of the foregoing, there is a need for improved methods and systems for providing validity logic. In addition, there is a need for providing validity logic for different types of data, such as customizing entities.

SUMMARY OF THE INVENTION

Consistent with embodiments of the present invention, systems and methods are disclosed for providing validity logic. As disclosed herein, systems and methods consistent with the invention may be adapted to determine the validity of data based one or more factors, such as user interaction, customizing settings, and/or programming logic with default value behavior. Embodiments of the present invention are also directed to customizing entity values that are marked or provided with validity logic. This may be done in such a way that software applications and users may decide, based on the validity logic, to use the values in certain situations where valid values may be required. This process may work on existing entities and may be generic.

In accordance with one embodiment, a method for providing validity logic comprises receiving at least one data value, determining validity data corresponding to the received at least one data value, and providing the validity data corresponding to the received at least one data value.

According to another embodiment, a method for providing validity logic comprises receiving at least one data value, receiving validity data corresponding to the received at least one data value, and determining, based on the received validity data, a validity value, the validity value indicating the validity of the received at least one data value.

In accordance with yet another embodiment, a system is provided that comprises a memory storage for maintaining a database, and a processing unit coupled to the memory storage, wherein the processing unit is operative to receive at least one data value, determine validity data corresponding to the received at least one data value, and provide the validity data corresponding to the received at least one data value.

In accordance with yet another embodiment, a system is provided that comprises a memory storage for maintaining a database, and a processing unit coupled to the memory storage, wherein the processing unit is operative to receive at least one data value, receive validity data corresponding to the received at least one data value, and determine, based on the received validity data, a validity value, the validity value indicating the validity of the received at least one data value.

In accordance with yet another embodiment, a computer-readable medium comprises a set of instructions which when executed performs a method for providing validity logic. The method executed by the set of instructions may comprise receiving at least one data value, determining validity data corresponding to the received at least one data value, and providing the validity data corresponding to the received at least one data value.

In accordance with yet another embodiment, a computer-readable medium stores a set of instructions which when executed performs a method for providing validity logic. The method executed by the set of instructions may comprise receiving at least one data value, receiving validity data corresponding to the received at least one data value, and determining, based on the received validity data, a validity value, the validity value indicating the validity of the received at least one data value.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
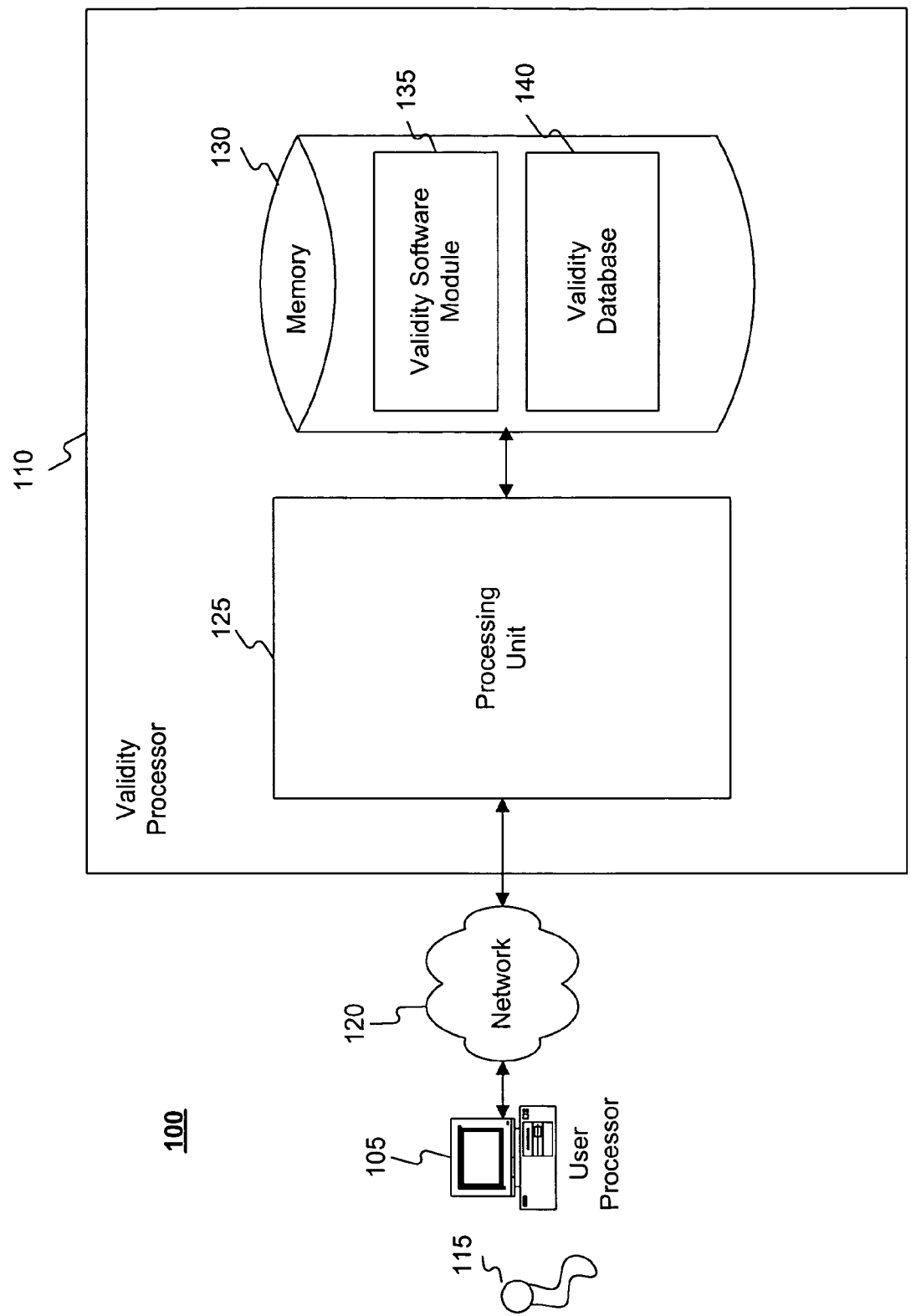
FIG. 1 is a block diagram of an exemplary system environment, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention may provide validity logic to make, for example, existing customizing entity values valid or invalid depending upon certain criteria. An existing software package with several customizing entities may be enhanced generically with a logic that may allow it to have a customizing subset available. The subset may be defined by several settings.

Existing customizing data, especially customizing entity data values, may be made valid or invalid by time, artificial category, or both. For example, when sharing master data items or company codes between plan, budget, and actual versions, individual data values may be marked as valid only for the plan version or may be marked valid only the actual version (validity by artificial categories.) In contrast to replicating or copying the master data for different versions in conventional systems, embodiments of the invention may not require master data duplication. Moreover, because embodiments of the invention may share the same master data, a need to keep different data versions synchronized may be eliminated.

Furthermore, by making newly created data values invalid or valid only beginning with the next month or other time period, for example, the newly created data values may not interfere with the system's productive use. The new data values may become active automatically once time passes to a validity date (validly by time.) Accordingly, new master data values may be created for later use while the system is being used in production with an old set of master data.

Moreover, existing master data values that are no longer used, but may be required for historic reference, may be archived. For example, an enterprise owning several companies may be required to retain company codes for several years to verify old reported financial statements, even if a company corresponding to a code has been sold or dissolved. The company codes, however, may only be used for historic reference, for example, the enterprise may no longer post any documents to the codes. Embodiments of the invention may also solve problems associated with dissolved company codes by using validity by time data, and setting the company code to be invalid after some certain point in time.

Consistent with embodiments of the present invention, customizing entity values may be marked or provided with validity logic. This may be done in such a way that software applications and users may decide, based on the validity logic, to use the values in certain situations where valid values may be required. This process may work on existing entities and may be generic. For example, four types of validity logic may be used: i) no validity logic; ii) validity by time; iii) validity by artificial categories; and iv) validity by time and artificial categories. For example, one artificial category may be "version." "Version" may correspond to information about different settings, for example, actual or planed, accounting principles, or internal or external. One or more different versions may be implemented for any given data value or customizing entity.

For example, as shown in Table 1, various artificial categories may comprise version 100, version 150, and version 200. For a given situation, version 100 may be valid, version 150 may be undefined and version 200 may be invalid.

TABLE 1

| Artificial Categories | Default |
|---|---|
| Version 100 | Valid |
| Version 150 | Undefined |
| Version 200 | Invalid |

The artificial categories may be determined according to a business process need. For example, version 100 may be a version for a particular accounting (e.g., US GAAP accounting), while version 150 may be for another type of accounting (e.g., IAS accounting.) Furthermore, for example, version 200 may be an accounting system "A" for planed calculations or an accounting system "B" for actual calculations.

There may be at least three validity values that can result from a validity check. For example, a first validity value may comprise "valid," which may mean a customizing entity data value may be valid and may be used without restrictions. A second validity value may comprise "invalid," which may mean a customizing entity data value may be invalid and may be used with restrictions. A third validity value may comprise "undefined," which may mean there is no validity information stored for the customizing entity data value. For "undefined", the customizing entity value may be used, for example, with knowledge of a default behavior that may make the value valid or invalid. Default behavior, which may be used when validity is undeterminable, may reduce maintenance efforts and storage space. The aforementioned validity values are exemplary and other may be used.

The default behavior may depend on the type of validity logic used. For example, with no validity logic, no default validation may be taken. For validity by time, a default for time validation may be taken. With validity by artificial categories, a default may depend on the artificial category's settings for the default behavior. If nothing is set for validity by artificial categories, a system wide default may be taken. And for validity by time and artificial categories, a default may depend on a combination of the aforementioned default for validity by time and the aforementioned default for validity by artificial categories.

Database tables may be generated for existing customizing entities that may include, for example, the validity logic as described above. These tables may comprise a key corresponding to a customizing entity data value and a validity data field called, for example "VALID". In addition, these tables may comprise one or more elements depending from the validity data field that designate validity type and validity information. For example, the validity type may indicate validity by time and the validity information may indicate the time for which the data value may be valid. In addition, the validity type may indicate validity by category and the validity information may indicate the category for which the data value may be valid. As described above, "VALID" may be the only attribute. All other fields may be database table key fields. The information that differs from the default may be stored in the database. This may minimize the needed disk space. Furthermore, there may be an artificial category that has the default behavior as an attribute. This may be stored in the database as well.

A process consistent with an embodiment of the invention may take the customizing entity data values and read the validity data in the database corresponding to them. The customizing entity data values may be used depending on time and/or artificial categories in the corresponding validity data. For customizing entity data values, where no corresponding validity data is in the database, default values may be taken. Ultimately, all customizing entity data values may be specified to be valid or invalid, with this information returned to a user. Optionally, the process may return valid data values if a user wants to work only on valid data values. Invalid data values may be deleted from the information returned to the user.

As an alternative, invalid data values may not be entered, but if the system produces records with invalid data values (for example, by listing financial statement data from previous periods where these values were still valid) these invalid values can be used as if they were valid. In another embodiment, these invalid data values may be used with certain restrictions (for example, only reduce or zero out the amounts posted on them). Moreover, invalid data values can be used, but a user may be informed with a warning message. In addition, with validity by time, the behavior may be different depending on whether the data values are valid for a previous point in time and are no longer valid or if the data values are not valid for any previous point in time.

An embodiment consistent with the invention may comprise a system for providing validity logic. The system may comprise a memory storage for maintaining a database and a processing unit coupled to the memory storage. The processing unit may be operative to receive at least one data value, to determine validity data corresponding to the received at least one data value, and to provide the validity data corresponding to the received at least one data value.

Another embodiment consistent with the invention may comprise another system for providing validity logic. This system may comprise a memory storage for maintaining a database and a processing unit coupled to the memory storage. The processing unit may be operative to receive at least one data value, to receive validity data corresponding to the received at least one data value, and to determine, based on the received validity data, a validity value, the validity value indicating the validity of the received at least one data value.

Consistent with an embodiment of the present invention, the aforementioned memory, processing unit, and other components may be implemented in a validity logic system, such as the exemplary, validity logic system 100 of FIG. 1. Any suitable combination of hardware, software and/or firmware may be used to implement the memory, processing unit, and/or other components. By way of example, the memory, processing unit, and/or other components may be implemented with a user processor 105 and/or validity processor 110, in combination with the components for system 100. The aforementioned system and processors are exemplary and other systems and processors may comprise the aforementioned memory, processing unit, and/or other components, consistent with embodiments of the present invention.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

By way of a non-limiting example, FIG. 1 illustrates exemplary system 100 in which the features and principles of the present invention may be implemented. As illustrated in the block diagram of FIG. 1, system 100 may include user processor 105, validity processor 110, a user 115, and a network 120. User 115 may be an individual, for example, desiring to create or use validated data using validity processor 110. User 115 may also represent an organization, enterprise, or any other entity having such desires or similar uses.

Validity processor 110 may include a processing unit 125 and a memory 130. Memory 130 may include a validity software module 135 and a validity database 140. Validity software module 135, residing in memory 130, may be executed on processing unit 125 and may access validity database 140. For example, validity software module 135 may be executed on processing unit 125 to perform processes consistent with embodiments of the invention, such as processes consistent with the methods described below with respect to FIG. 2 and FIG. 4.

User processor 105 or validity processor 110 ("the processors") included in system 100 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN). Such networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via, diskette, CD ROM, facsimile, conventional mail, an interactive voice response system (IVR), or via voice over a publicly switched telephone network.

Figure 2:
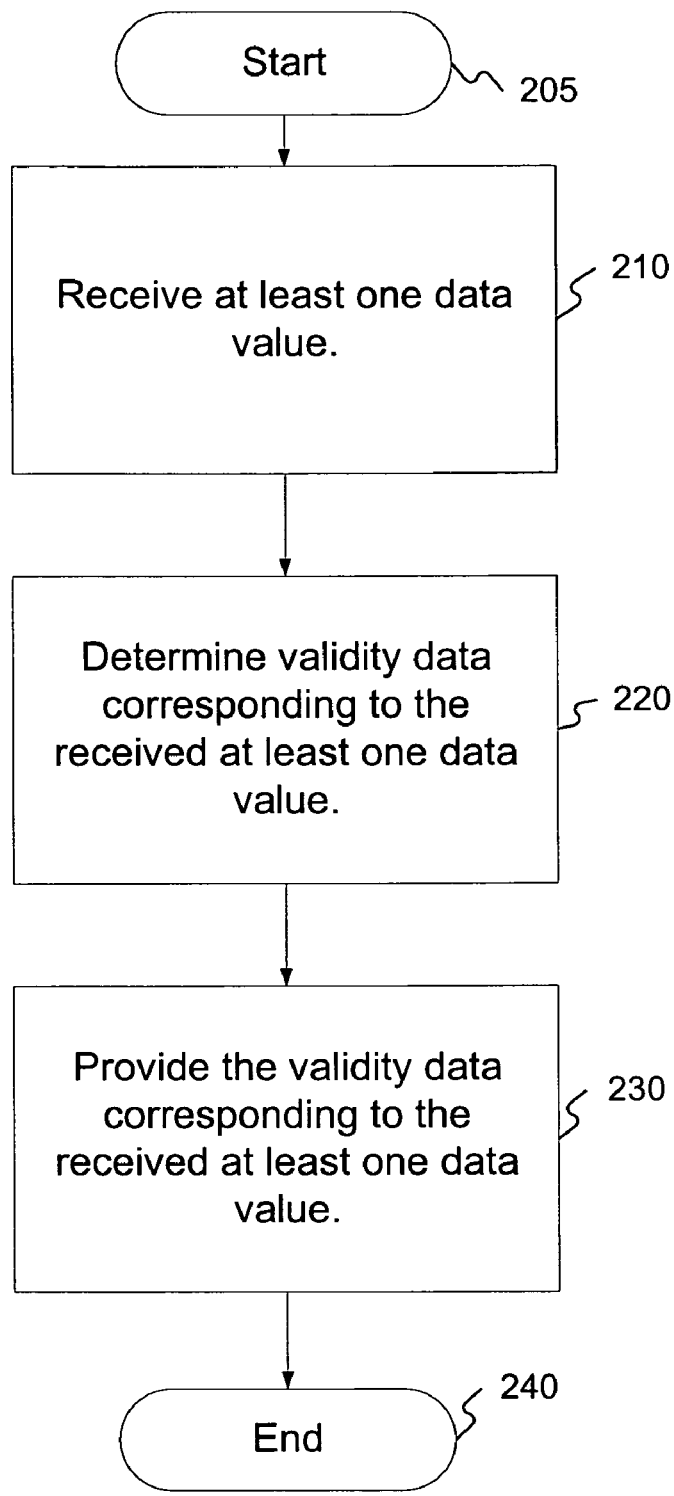
FIG. 2 is a flow chart of an exemplary method for providing validity logic, consistent with an embodiment of the present invention.

FIG. 2 is a flow chart setting forth the general stages involved in an exemplary method 200, consistent with an embodiment of the invention. Method 200 may be used for providing validity logic using, for example, system 100 of FIG. 1. Exemplary ways to implement the stages of exemplary method 200 will be described in greater detail below.

Exemplary method 200 may begin at starting block 205 and proceed to stage 210 where processor 110 may receive a data value. For example, processor 110 may receive the data value from user processor 105 over network 120. Additionally, or alternatively, the data value may already be stored in validity database 140.

Figure 3A:
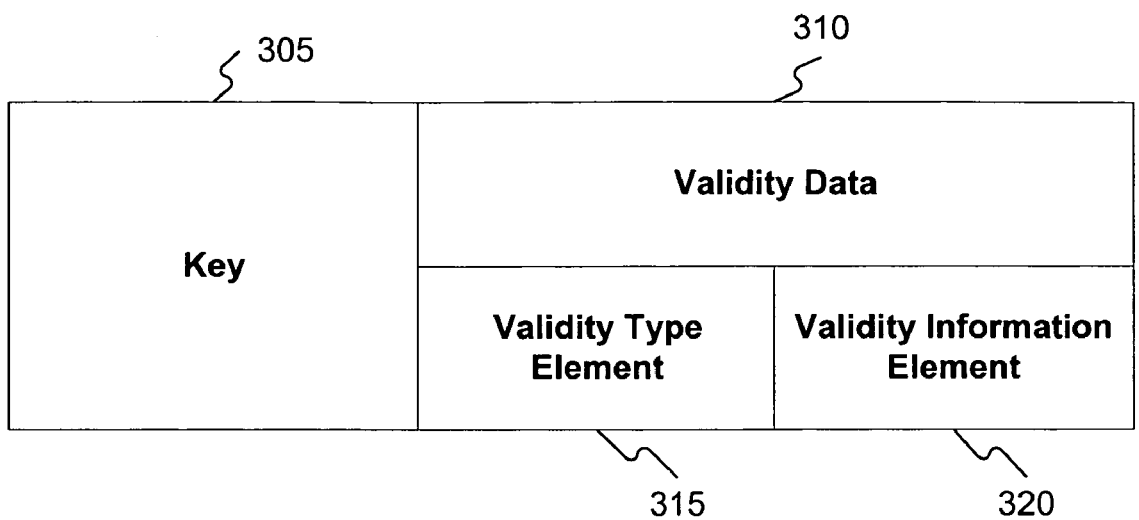
FIGS. 3A and 3B illustrate an exemplary data value and validity database tables, respectively, consistent with embodiments of the present invention.
Figure 3B:
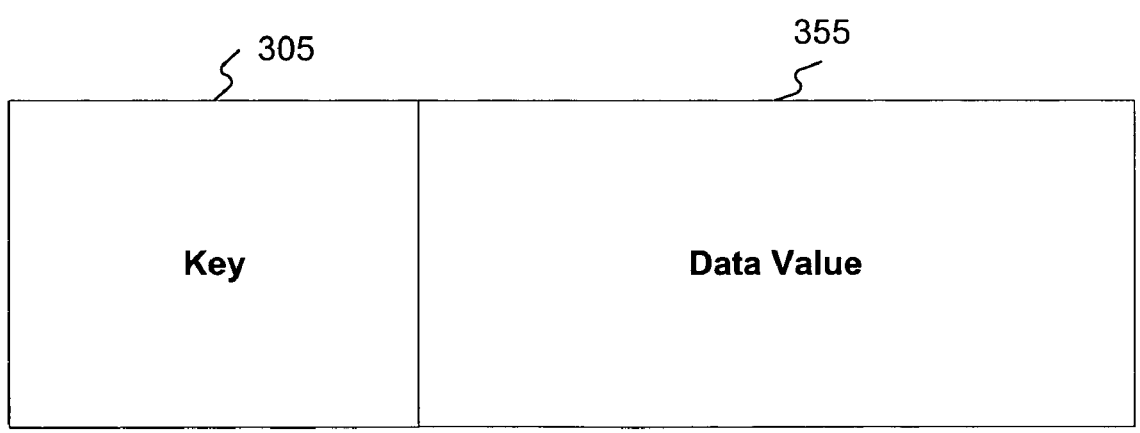

From stage 210, where processor 110 receives the data value, exemplary method 200 may advance to stage 220 where processor 110 may determine validity data corresponding to the received data value. By way of example, the validity data may indicate one of the following validity types: i) no validity, ii) validity by time, iii) validity by artificial category, and iv) validity by time and artificial category. The aforementioned validity types are exemplary and others may be used. Processor 110 may, for example, determine validity data corresponding to the received data value using, for example, one or more database tables. In one embodiment, a data value database table is provided which is analyzed by processor 110 to determine a key based on the received data value. The key can then be used by processor 110 to look-up and identify corresponding validity data for the received data value using, for example, a validity database table. Exemplary data value and validity database tables as further described below with reference to FIGS. 3A and 3B. As will be appreciated by one skilled in the art, the tables of FIGS. 3A and 3B are for purposes of illustration and other tables and techniques may be used, consistent with the present invention. For instance, a single database table may be utilized where a received data value directly serves as a key or index for identifying the corresponding validity data.

FIG. 3A illustrates an exemplary database table 300, consistent with an embodiment of the invention. Table 300 may be stored in memory 130 (such as a part of validity database 140 or separately) and used by processing unit 125 to determine a key or index for the received data value. As shown in FIG. 3A, table 300 may comprise one or more keys 305 and one or more corresponding data values 355. By searching table 300, processor 110 may determine the corresponding key for the received data value and, using that key, the corresponding validity data may be identified from a validity database table.

Referring to FIG. 3B, an exemplary validity database table 350 is shown, consistent with an embodiment of the present invention. Table 350 may also be stored in memory 130, either as part of validity database 140 or separately. As disclosed above, table 350 may be used by processing unit 125 of processor 110 when determining the validity data for a received data value. Table 350 may comprise one or more keys 305 and one or more corresponding entries of validity data 310. In accordance with one embodiment, each key may have a corresponding validity data entry, and each validity data entry may comprise information, such as a validity type element and/or a validity information element (see FIG. 3B). As will be appreciated by those skilled in the art, validity database table 350 is exemplary and other database tables and/or other ways of determining validity data may be used.

As shown in the example of FIG. 3B, each validity data entry 310 may comprise a validity type element 315 and a validity information element 320. If validity type element 315 indicates validity by time, validity information element 320 may comprise time data indicating a time period for which the received data value is deemed to be valid and/or a time period for which the received data value is invalid. If validity type element 315 indicates validity by artificial category, validity information element 320 may comprise category data indicating a category for which the received data value is valid and/or category for which the received data value is invalid. If validity type element 315 indicates validity by time and artificial category, validity information element 320 may comprise both: i) time data indicating a time period for which the received data value is valid and/or a time period for which the received data value is invalid; and ii) category data indicating a category for which the received data value is valid and/or category for which the received data value is invalid. Furthermore, one or both of validity type element 315 and validity information element 320 may be blank or otherwise contain data indicating no validity.

For example, the following Tables 2, 3, and 4 illustrate validity by time, validity by artificial category, and validity by time and artificial category, respectively.

TABLE 2

| Company | Time | Validity |
|---------|------|----------|
| "XYZ" | 03/2004 - 09/2004 | Valid |
| "XYZ" | 10/2004 - 12/2009 | Invalid |

TABLE 3

| Company | Artificial Category | Validity |
|---------|---------------------|----------|
| "XYZ" | Version 100 | Valid |
| "XYZ" | Version 150 | Valid |

TABLE 4

| Company | Artificial Category | Time | Validity |
|---------|---------------------|------|----------|
| "XYZ" | Version 100 | 01/2004 - 12/2004 | Invalid |
| "XYZ" | Version 100 | 01/2005 - 12/2009 | Valid |

Using the above tables, for example, if a validity request is for: company "XYZ"; time 01/2004; and version 100, "valid" may be retuned if validity type is validity by time (Table 2). If the validity type is validity by artificial category (Table 3) for example, then "valid" may be returned. Furthermore, if the validity type is validity by time and artificial category (Table 4), then "invalid" may be returned for example. As another example, if validity request is for: company "XYZ"; time 01/2004; and version 200, "valid" may be returned if validity type is validity by time (Table 2). If the validity type is validity by artificial category (Table 3) for example, then "undefined" may be returned. Furthermore, if the validity type is validity by time and artificial category (Table 4), then "invalid" may be returned for example.

Referring again to FIG. 2, once processor 110 determines validity data corresponding to the received data value in stage 220, exemplary method 200 may continue to stage 230 where processor 110 may provide the validity data corresponding to the received data value. For example, processor 110 may provide the validity data 310 from the entry in validity database table 350 corresponding to the key for the received data value.

Figure 4:
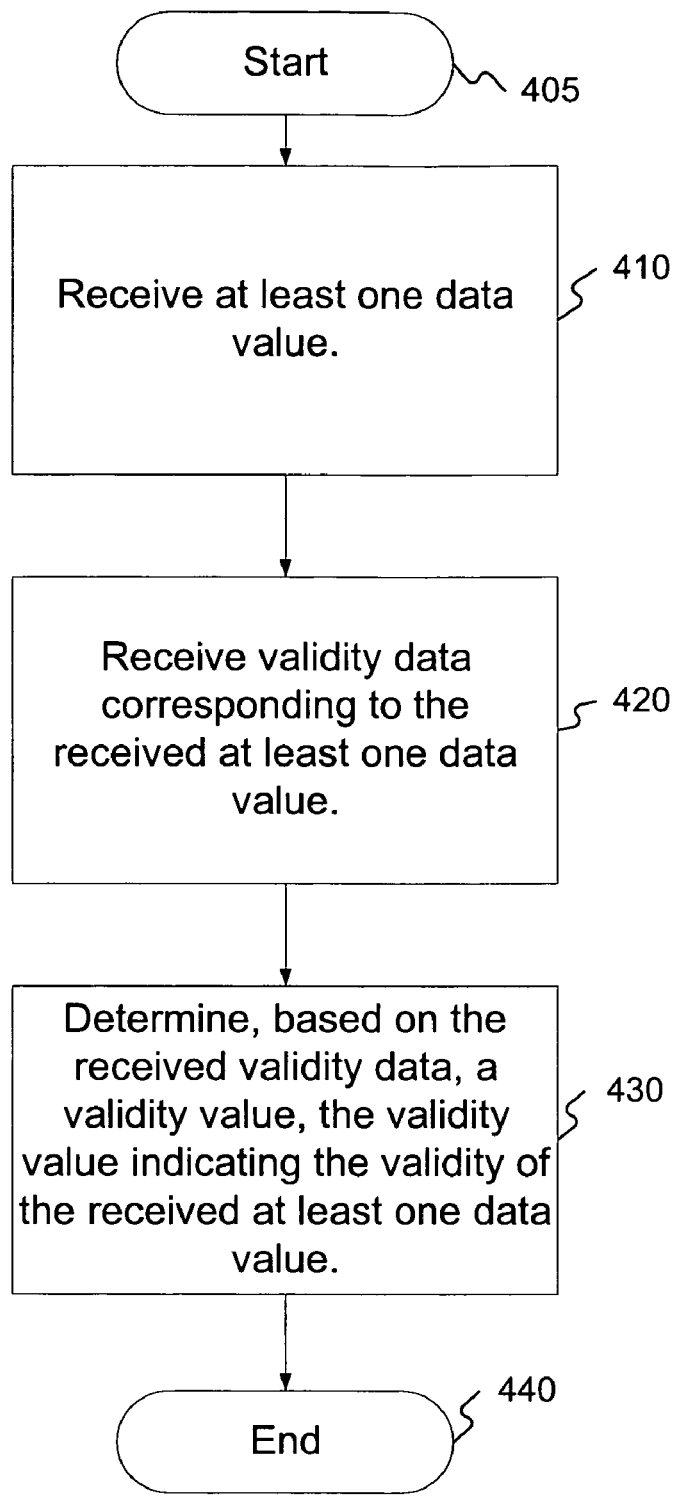
FIG. 4 is a flow chart of another exemplary method for providing validity logic, consistent with an embodiment of the present invention.

FIG. 4 is a flow chart setting forth the general stages involved in an exemplary method 400, consistent with an embodiment of the invention. Method 400 may be used for providing validity logic using, for example, system 100 of FIG. 1. Exemplary ways to implement the stages of exemplary method 400 will be described in greater detail below.

Exemplary method 400 may begin at starting block 405 and proceed to stage 410 where processor 110 may receive a data value. For example, processor 110 may receive the data value from user processor 105 over network 120. Additionally, or alternatively, the data value may already be stored in validity database 140. Further, it is possible that the data value is provided along with other data, such as a key for searching a validity database table.

From stage 410, where processor 110 receives the data value, exemplary method 400 may advance to stage 420 where processor 110 may receive validity data corresponding to the received data value. As part of this stage, processor 110 may for example analyze data value database table 300 to determine a key corresponding to the received data value. Using the key from database table 300, processor 110 may locate and receive the validity data from validity database table 350 for the received data value. As described above with respect to FIG. 3B, validity data 310 may comprise validity type element 315 and validity information element 320.

Once processor 110 receives validity data corresponding to the received data value in stage 420, exemplary method 400 may continue to stage 430 where processor 110 may determine, based on the received validity data, a validity value. The validity value may indicate the validity of the received data value. For example, processor 110 may analyze validity type element 315 and validity information element 320 to provide the validity value. The validity value may indicate, for example, that the received data value is valid, invalid, or undefined.

For validity by time, processor 110 may provide a validity value indicating that the received data value is valid if validity type element 315 indicates validity by time and if validity information element 320 comprises time data that indicates a time period for which the received data value is valid. For example, processor 110 may return a "valid" validity value if validity information element 320 indicates that the data value is only good after a certain date and that date has passed.

Alternatively, processor 110 may provide a validity value indicating that the received data value is invalid if validity type element 315 indicates validity by time and if validity information element 320 comprises time data that indicates a time period for which the received data value is invalid. For example, processor 110 may return an "invalid" validity value if validity information element 320 indicates that the data value is only good after a certain date and that date has not passed.

For validity by artificial category, processor 110 may provide a validity value indicating that the received data value is valid if validity type element 315 indicates validity by artificial category and if validity information element 320 comprises category data that indicates a category for which the received data value is valid. For example, processor 110 may return a "valid" validity value if validity information element 320 indicates that the data value is only good for budgeting purposes and that the data is being used for budgeting purposes.

Alternatively, processor 110 may provide a validity value indicating that the received data value is invalid if validity type element 315 indicates validity by artificial category and if validity information element 320 comprises a category code or data that indicates a category for which the received data value is invalid. For example, processor 110 may return an "invalid" validity value if validity information element 320 indicates that the data value is only good for budgeting purposes and that the data is not being used for budgeting purposes.

For validity by time and artificial category, processor 110 may provide a validity value indicating that the received data value is valid if validity type element 315 indicates validity by time and artificial category and if validity information element 320 comprises time data that indicates a time period for which the received data value is valid and if validity information element 320 comprises a category code or data that indicates a category for which the received data value is valid. For example, processor 110 may return a "valid" validity value if validity information element 320 indicates that the data value is only good for budgeting purposes after a certain date and that the data is being used for budgeting purposes after that date.

Alternatively, processor 10 may provide a validity value indicating that the received data value is invalid if validity type element 315 indicates validity by time and artificial category and if validity information element 320 comprises time data that indicates a time period for which the received data value is invalid and if validity information element 320 comprises a category code or data that indicates a category for which the received data value is invalid. For example, processor 110 may return an "invalid" validity value if validity information element 320 indicates that the data value is only good for budgeting purposes after a certain date and that the data is not being used for budgeting purposes or it is not after that date.

In addition, processor 110 may provide a validity value indicating that the received data value is "undefined" if, for example, one or both of validity type element 315 and validity information element 320 is either blank or is otherwise undefined. Also, for any of the above validity type situations, included when one or both of validity type element 315 and validity information element 320 is either blank or undefined, processor 110 may determine, based on the received validity data, that the validity value should comprise a default value. The default value may depend upon the validity type indicated by the validity data. For example, if the received data value is "undefined", an "invalid" validity value may be provided by processor 110 by default. After processor 110 determines the validity value in stage 440, exemplary method 400 may then end at stage 440.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for providing validity logic, the method comprising:
    storing validity data;
    receiving at least one data value;
    determining, from the stored validity data, validity data corresponding to the received at least one data value, wherein the determined validity data comprises:
        a validity type element indicating one of the following validity types: validity by time, validity by artificial category, and validity by time and artificial category, and
        a validity information element, wherein
        if the validity type element indicates validity by time, the validity information element comprises time data including at least one of a time period for which the received at least one data value is valid and a time period for which the received at least one data value is invalid; and
    based on the determined validity data corresponding to the received at least one data value, providing a validity value by a processor.

2. The method of claim 1, wherein if the validity type element indicates validity by artificial category, the validity information element comprises category data indicating at least one of a category for which the received at least one data value is valid and a category for which the received at least one data value is invalid.

3. The method of claim 1, wherein if the validity type element indicates validity by time and artificial category, the validity information element comprises:
    time data indicating at least one of a time period for which the received at least one data value is valid and a time period for which the received at least one data value is invalid; and
    category data indicating at least one of a category for which the received at least one data value is valid and a category for which the received at least one data value is invalid.

4. A method for providing validity logic, the method comprising:
    storing validity data;
    receiving at least one data value;
    receiving, from the stored validity data, validity data corresponding to the received at least one data value, the received validity data comprising a validity type element and a validity information element; and
    determining, based on the received validity data, a validity value, the validity value indicating the validity of the received at least one data value, wherein determining the validity value comprises:
        providing a validity value indicating that the received at least one data value is valid if the validity type element indicates validity by artificial category and if the validity information element comprises category data that indicates a category for which the received at least one data value is valid; and
        providing a validity value indicating that the received at least one data value is invalid if the validity type element indicates validity by artificial category and if the validity information element comprises category data that indicates a category for which the received at least one data value is invalid.

5. The method of claim 4, wherein determining the validity value comprises:
    providing the validity value indicating that the received at least one data value is valid if the validity type element indicates validity by time and if the validity information element comprises time data that indicates a time period for which the received at least one data value is valid; and
    providing the validity value indicating that the received at least one data value is invalid if the validity type element indicates validity by time and if the validity information element comprises time data that indicates a time period for which the received at least one data value is invalid.

6. The method of claim 4, wherein determining the validity value comprises:
    providing the validity value indicating that the received at least one data value is valid if the validity type element indicates validity by time and artificial category and if the validity information element comprises time data that indicates a time period for which the received at least one data value is valid and if the validity information element comprises a category data that indicates a category for which the received at least one data value is valid; and
    providing the validity value indicating that the received at least one data value is invalid if the validity type element indicates validity by time and artificial category and if the validity information element comprises time data that indicates a time period for which the received at least one data value is invalid and if the validity information element comprises a category data that indicates a category for which the received at least one data value is invalid.

7. The method of claim 4, wherein determining the validity value comprises providing the validity value indicating that the received at least one data value is undefined if at least one of the validity type element and the validity information element is at least one of blank and undefined.

8. The method of claim 4, wherein the validity value indicates one of the following: that the received at least one data value is valid, that the received at least one data value is invalid, and that the validity of the received at least one data value is undefined.

9. The method of claim 4, wherein determining the validity value comprises providing a default value for the validity value.

10. The method of claim 9, wherein the default value depends upon a validity type indicated by the received validity data.

11. A system for providing validity logic, the system comprising:
   a memory storage for maintaining a database that includes validity data; and
   a processing unit coupled to the memory storage, wherein the processing unit is operative to
   receive at least one data value;
   determine, from the stored validity data, validity data corresponding to the received at least one data value, wherein the determined validity data comprises:
      a validity type element indicating one of the following validity types: validity by time, validity by artificial category, and validity by time and artificial category, and
      a validity information element, wherein
      if the validity type element indicates validity by time, the validity information element comprises time data including at least one of a time period for which the received at least one data value is valid and a time period for which the received at least one data value is invalid; and
   based on the determined validity data corresponding to the received at least one data value, provide a validity value.

12. The system of claim 11, wherein if the validity type element indicates validity by artificial category, the validity information element comprises category data indicating at least one of a category for which the received at least one data value is valid and a category for which the received at least one data value is invalid.

13. The system of claim 11, wherein if the validity type element indicates validity by time and artificial category, the validity information element comprises:
   time data indicating at least one of a time period for which the received at least one data value is valid and a time period for which the received at least one data value is invalid; and
   category data indicating at least one of a category for which the received at least one data value is valid and a category for which the received at least one data value is invalid.

14. A system for providing validity logic, the system comprising:
   a memory storage for maintaining a database that includes validity data; and
   a processing unit coupled to the memory storage, wherein the processing unit is operative to
   receive at least one data value;
   receive, from the stored validity data, validity data corresponding to the received at least one data value, the received validity data comprising a validity type element and a validity information element; and
   determine, based on the received validity data, a validity value, the validity value indicating the validity of the received at least one data value, wherein determining the validity value comprises:
      providing a validity value indicating that the received at least one data value is valid if the validity type element indicates validity by artificial category and if the validity information element comprises category data that indicates a category for which the received at least one data value is valid; and
      providing a validity value indicating that the received at least one data value is invalid if the validity type element indicates validity by artificial category and if the validity information element comprises category data that indicates a category for which the received at least one data value is invalid.

15. The system of claim 14, wherein determining the validity value comprises:
   providing the validity value indicating that the received at least one data value is valid if the validity type element indicates validity by time and if the validity information element comprises time data that indicates a time period for which the received at least one data value is valid; and
   providing the validity value indicating that the received at least one data value is invalid if the validity type element indicates validity by time and if the validity information element comprises time data that indicates a time period for which the received at least one data value is invalid.

16. The system of claim 14, wherein determining the validity value comprises:
   providing the validity value indicating that the received at least one data value is valid if the validity type element indicates validity by time and artificial category and if the validity information element comprises time data that indicates a time period for which the received at least one data value is valid and if the validity information element comprises category data that indicates a category for which the received at least one data value is valid; and
   providing the validity value indicating that the received at least one data value is invalid if the validity type element indicates validity by time and artificial category and if the validity information element comprises time data that indicates a time period for which the received at least one data value is invalid and if the validity information element comprises category data that indicates a category for which the received at least one data value is invalid.

17. The system of claim 14, wherein determining the validity value further comprises providing the validity value indicating that the received at least one data value is undefined if at least one of the validity type element and the validity information element is at least one of blank and undefined.

18. The system of claim 14, wherein the validity value indicates one of the following: that the received at least one data value is valid, that the received at least one data value is invalid, and that the validity of the received at least one data value is undefined.

19. The system of claim 14, wherein determining the validity value comprises providing a default value for the validity value.

20. The system of claim 19, wherein the default value depends upon a validity type indicated by the received validity data.

21. A computer-readable storage medium which stores a set of instructions which when executed performs a method for providing validity logic, the method executed by the set of instructions comprising:
   receiving at least one data value;

determining validity data corresponding to the received at least one data value, wherein the determined validity data comprises:
- a validity type element indicating one of the following validity types: validity by time, validity by artificial category, and validity by time and artificial category, and
- a validity information element, wherein
- if the validity type element indicates validity by time, the validity information element comprises time data including at least one of a time period for which the received at least one data value is valid and a time period for which the received at least one data value is invalid; and based on the determined validity data corresponding to the received at least one data value, providing a validity value.

22. The computer-readable storage medium of claim 21, wherein if the validity type element indicates validity by artificial category, the validity information element comprises category data indicating at least one of a category for which the received at least one data value is valid and a category for which the received at least one data value is invalid.

23. The computer-readable storage medium of claim 21, wherein if the validity type element indicates validity by time and artificial category, the validity information element comprises:
- time data indicating at least one of a time period for which the received at least one data value is valid and a time period for which the received at least one data value is invalid; and
- category data indicating at least one of a category for which the received at least one data value is valid and a category for which the received at least one data value is invalid.

24. A computer-readable storage medium which stores a set of instructions which when executed performs a method for providing validity logic, the method executed by the set of instructions comprising:
- receiving at least one data value;
- receiving validity data corresponding to the received at least one data value, the received validity data comprising a validity type element and a validity information element; and
- determining, based on the received validity data, a validity value, the validity value indicating the validity of the received at least one data value, wherein determining the validity value comprises:
  - providing a validity value indicating that the received at least one data value is valid if the validity type element indicates validity by artificial category and if the validity information element comprises category data that indicates a category for which the received at least one data value is valid; and
  - providing a validity value indicating that the received at least one data value is invalid if the validity type element indicates validity by artificial category and if the validity information element comprises category data that indicates a category for which the received at least one data value is invalid.

25. The computer-readable storage medium of claim 24, wherein determining the validity value comprises:
- providing the validity value indicating that the received at least one data value is valid if the validity type element indicates validity by time and if the validity information element comprises time data that indicates a time period for which the received at least one data value is valid; and
- providing the validity value indicating that the received at least one data value is invalid if the validity type element indicates validity by time and if the validity information element comprises time data that indicates a time period for which the received at least one data value is invalid.

26. The computer-readable storage medium of claim 24, wherein determining the validity value comprises:
- providing the validity value indicating that the received at least one data value is valid if the validity type element indicates validity by time and artificial category and if the validity information element comprises time data that indicates a time period for which the received at least one data value is valid and if the validity information element comprises category data that indicates a category for which the received at least one data value is valid; and
- providing the validity value indicating that the received at least one data value is invalid if the validity type element indicates validity by time and artificial category and if the validity information element comprises time data that indicates a time period for which the received at least one data value is invalid and if the validity information element comprises category data that indicates a category for which the received at least one data value is invalid.

27. The computer-readable storage medium of claim 24, wherein determining the validity value comprises providing the validity value indicating that the received at least one data value is undefined if at least one of the validity type element and the validity information element is at least one of blank and undefined.

28. The computer-readable storage medium of claim 24, wherein the validity value indicates one of the following: that the received at least one data value is valid, that the received at least one data value is invalid, and that the validity of the received at least one data value is undefined.

29. The computer-readable storage medium of claim 24, wherein determining the validity value comprises providing a default value for the validity value.

30. The computer-readable storage medium of claim 29, wherein the default value depends upon a validity type indicated by the validity data.

* * * * *